(12) United States Patent
Hwang et al.

(10) Patent No.: US 9,306,268 B2
(45) Date of Patent: Apr. 5, 2016

(54) ELECTRONIC DEVICE AND METHOD FOR MANUFACTURING THE SAME

(71) Applicant: Samsung Electronics Co., Ltd., Suwon-si, Gyeonggi-do (KR)

(72) Inventors: Chang-Youn Hwang, Hwaseong-si (KR); Hak-Ju Kim, Gumi-si (KR); Hee-Cheul Moon, Seongnam-si (KR); Jong-Chul Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 116 days.

(21) Appl. No.: 14/176,580

(22) Filed: Feb. 10, 2014

(65) Prior Publication Data

US 2014/0266924 A1 Sep. 18, 2014

(30) Foreign Application Priority Data

Mar. 13, 2013 (KR) ........................ 10-2013-0026946

(51) Int. Cl.
*H01Q 1/24* (2006.01)
*G06F 1/16* (2006.01)
*H01Q 1/36* (2006.01)
*H01Q 1/42* (2006.01)
*H01Q 13/18* (2006.01)
*H01Q 7/00* (2006.01)
*H01Q 1/40* (2006.01)

(52) U.S. Cl.
CPC .............. *H01Q 1/243* (2013.01); *G06F 1/1626* (2013.01); *H01Q 1/36* (2013.01); *H01Q 1/42* (2013.01); *G06F 1/1698* (2013.01); *H01Q 1/40* (2013.01); *H01Q 7/00* (2013.01); *H01Q 13/18* (2013.01); *Y10T 29/49155* (2015.01)

(58) Field of Classification Search
CPC ......... H01Q 1/243; H01Q 13/18; H01Q 1/42; H01Q 112/07; H01Q 7/00; H01Q 1/40
USPC .................. 343/702, 872, 878, 867, 789, 873
See application file for complete search history.

(56) References Cited

U.S. PATENT DOCUMENTS

| 8,325,094 | B2 | 12/2012 | Ayala et al. |
| 9,059,505 | B1 * | 6/2015 | Asrani et al. |
| 2010/0040800 | A1 | 2/2010 | Zhang et al. |
| 2010/0053002 | A1 * | 3/2010 | Wojack et al. ................. 343/702 |
| 2010/0098890 | A1 | 4/2010 | Hou et al. |

(Continued)

FOREIGN PATENT DOCUMENTS

| EP | 1 887 495 A2 | 2/2008 |
| EP | 2 452 399 A1 | 5/2012 |
| JP | 11330830 A | 11/1999 |
| JP | 2011199343 A | 10/2011 |
| JP | 2012039466 A | 2/2012 |

(Continued)

*Primary Examiner* — Joseph Lauture
(74) *Attorney, Agent, or Firm* — Jefferson IP Law, LLP (57) ABSTRACT

An electronic device and a method for manufacturing an outer housing of the electronic device are provided. The electronic device includes an outer housing including a portion including a base including a non-conductive material and a plurality of islands formed on or above the base, wherein the plurality of islands include metallic materials, wherein the plurality of islands are spaced apart from each other, and wherein the plurality of islands form a two-dimensional (2D) pattern. The method includes injection-molding a base and forming a plurality of islands on or above the base, wherein the plurality of islands include metallic materials, and wherein the plurality of islands are spaced apart from each other to form a 2D pattern.

28 Claims, 7 Drawing Sheets

(56) References Cited

U.S. PATENT DOCUMENTS

| | | |
|---|---|---|
| 2010/0188298 A1 | 7/2010 | Suzuki et al. |
| 2011/0006953 A1 | 1/2011 | Chiang et al. |
| 2011/0227799 A1 | 9/2011 | Hashimoto |
| 2012/0075148 A1 | 3/2012 | Cho |
| 2012/0329531 A1 | 12/2012 | Park et al. |

FOREIGN PATENT DOCUMENTS

| | | |
|---|---|---|
| KR | 1020020080603 A | 10/2002 |
| KR | 1020080049702 A | 6/2008 |
| KR | 101078591 B1 | 10/2011 |
| KR | 1020120140373 A | 12/2012 |
| WO | 2008146396 A1 | 12/2008 |

* cited by examiner

ELECTRONIC DEVICE AND METHOD FOR MANUFACTURING THE SAME

PRIORITY

This application claims the benefit under 35 U.S.C. §119 (a) of a Korean patent application filed on Mar. 13, 2013 in the Korean Intellectual Property Office and assigned Serial No. 10-2013-0026946, the entire disclosure of which is hereby incorporated by reference.

BACKGROUND OF THE INVENTION

1. Field of the Invention

The present invention relates to an electronic device and a method for manufacturing the same.

2. Description of the Related Art

Generally, electronic devices may be devices which enable users to enjoy various contents while carrying them, such as digital audio players, Portable Multimedia Players (PMPs), and electronic books, and recently, functions of allowing users to use various contents with a single terminal have been provided. Portable electronic devices may have diverse form factors according to a use of the portable electronic devices, a historical flow, or consumer's demand or tendency, and recently, portable electronic devices that are terminals, such as smart phones or tablets, have come into popular use due to their capabilities being similar to Personal Computers (PCs).

Therefore, as mentioned above, with a single terminal, users may enjoy data transmission/reception and note or multimedia functions as well as transmission/reception for voice communication, and also enjoy various contents such as a banking service, an entertainment service like a game, a wireless Internet service, and a variety of other functions, services, features, and operations of communication terminals and PCs.

For example, a bar-type electronic device, which may be referred to as a bar-type terminal or a terminal, includes a display unit which is disposed on a front side, and a terminal case in which internal modules for various functions are mounted and which covers and supports the internal modules. In particular, the terminal case which encloses the display unit and the internal modules, and a battery cover which is provided on a rear side to be coupled to the terminal case and to cover a battery are disposed in the case of the electronic device. The terminal case may be manufactured with various materials, for example, plastic, magnesium alloys, or aluminum alloys, but the terminal case should be lightweight and also should have excellent anti-wear property, anti-shock property, and yield strength. Moreover, since the terminal case includes at least one antenna for transmission/reception of data and/or voice communication, it may be preferably formed of a non-conductive material so as not to affect radiation performance. That is, when the case of the electronic device is made of a metallic material, antenna radiation performance provided in the case may be unreliable.

In addition, a user may choose an electronic device having an elegant design and a high-quality exterior among electronic devices having similar functions and similar prices. For an elegant design and a high-quality exterior, a metallic material or a material having a metallic texture is preferred to a non-conductive material. Although a metallic material may make an exterior design elegant and luxurious, it may be an obstacle to good antenna radiation performance. Moreover, even if luxuriousness or a high-quality exterior is pursued by expression of a metallic texture with a non-conductive material, for example, tin (Sn) or with silver-color coating, luxuriousness or a high-quality exterior may be degraded when compared to use of an actual metallic material.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an electronic device and a method for manufacturing the same, in which an outer housing of the electronic device may be manufactured using a metallic material.

Another aspect of the present invention is to provide an electronic device and a method for manufacturing the same, in which even if a metallic material is provided on an outer housing, antenna performance may be not unreliable, material diversification may be achieved, and luxuriousness of the outer housing may be secured.

In accordance with an aspect of the present invention, an electronic device is provided. The electronic device includes an outer housing including a portion that includes a base including a non-conductive material and a plurality of islands formed on or above the base, wherein the plurality of islands include metallic materials, wherein the plurality of islands are spaced apart from each other, and wherein the plurality of islands form a two-dimensional (2D) pattern.

In accordance with another aspect of the present invention, an outer housing of an electronic device is provided. The outer housing includes a base formed of a non-conductive material, and islands formed of a conductive material deposited on the base, wherein the islands are formed discontinuously on the base such that the conductive material and the non-conductive material are positioned alternately.

In accordance with another aspect of the present invention, an outer housing of an electronic device is provided. The outer housing includes a surface comprising a non-conductive material and a conductive material forming a regular or an irregular pattern, wherein the non-conductive material and the conductive material are both formed discontinuously.

In accordance with another aspect of the present invention, an electronic device is provided. The electronic device includes a base formed of a non-conductive material in a shape of at least one of a front case, a rear case, and a base cover, the base being injection-molded and islands including pieces formed by depositing a conductive metallic material on a surface of the base and by performing etching or laser processing, the pieces being spaced apart from each other so as to not physically contact each other.

In accordance with another aspect of the present invention, a method for manufacturing an outer housing of an electronic device is provided. The method includes injection-molding a base and forming a plurality of islands on or above the base, wherein the plurality of islands include metallic materials, and wherein the plurality of islands are spaced apart from each other to form a 2D pattern.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other, aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
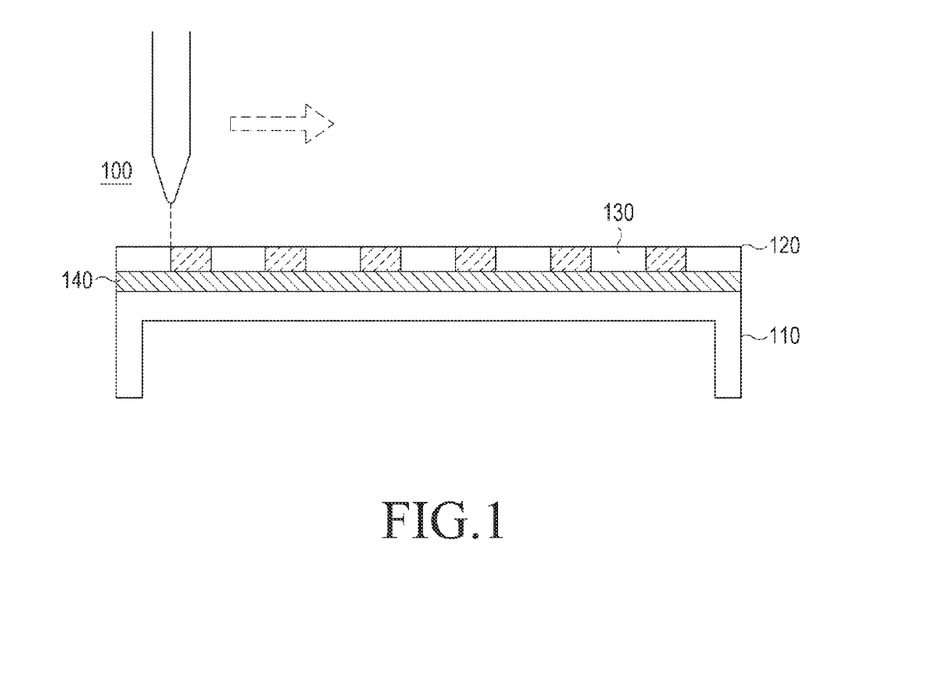
FIG. 1 is a diagram illustrating an outer housing of an electronic device according to an exemplary embodiment of the present invention.
Figure 2:
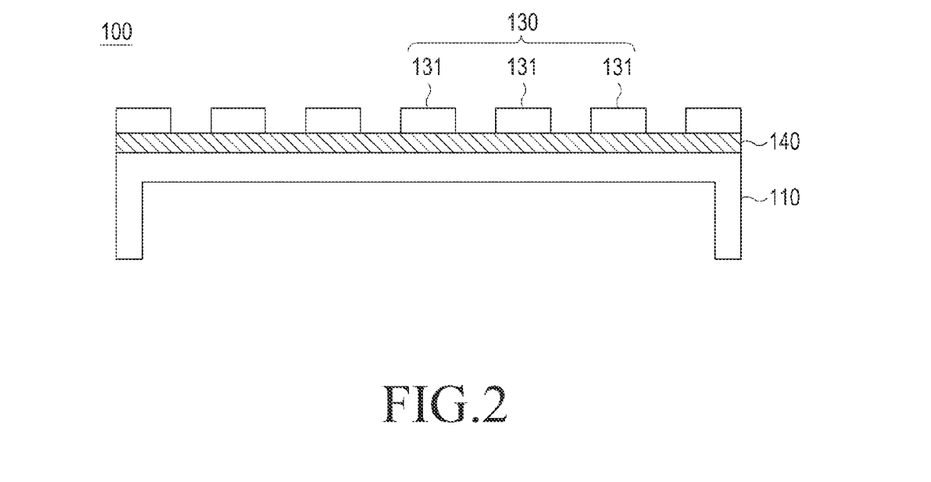
FIG. 2 is a diagram illustrating a state in which islands are formed on a base according to the exemplary embodiment illustrated in FIG. 1.

FIG. 1 is a diagram illustrating an outer housing of an electronic device according to an exemplary embodiment of the present invention, and FIG. 2 is a diagram illustrating a state in which islands are formed on a base according to the exemplary embodiment illustrated in FIG. 1.

Referring to FIGS. 1 and 2, an outer housing 100 provided on an electronic device 10 (see FIG. 9), such as a portable terminal, includes a base 110 and islands 130. The outer housing 100 includes, on or above the base 110, a deposition layer 120 of a conductive material. More specifically, a plurality of islands 130 are formed by processing the deposition layer 120. In particular, the islands 130 are spaced apart from each other to be formed discontinuously on or above the base 110. The islands 130 are conductive materials which form a two-dimensional (2D) pattern and have a regular or irregular pattern.

The base 110 forms an exterior of the outer housing 100, and, for example, when the base 110 is provided on the electronic device 10, then the base 110 is a structure which has a front case (not shown) provided along a circumference of a display disposed on a front surface of the electronic device 10, a rear case (not shown) coupled to the front case, and a battery cover having a function of protecting a battery. The base 110 is formed of a non-conductive material, for example, a plastic material such as Polycarbonate (PC) or Polyethyleneterephthalate (PET). In addition, as will be described below, the islands 130 may be formed in an antenna pattern to function as an antenna. In this case, in order to form the antenna pattern on the deposition layer 120 by using a Laser Direct Structuring (LDS) method, the base 110 may be injection-molded with the LDS resin. The antenna pattern may also be formed after the deposition layer 120 is formed by coating LDS resin on the surface of the base 110 molded with a material such as PC or PET. The LDS resin may be formed of resin such as Acrylonitrile Butadiene Styrene (ABS) or PC+ABS or may be manufactured by coating resin on the surface of the base 110 in a position in which the deposition layer 120 is formed.

The islands 130 include a metallic material and the plurality of islands 130 are formed on or above the base 110. The islands 130 are spaced apart from each other and form a 2D pattern. The islands 130 are formed by partially removing the deposition layer 120, which is formed by depositing a conductive metallic material on the surface of the base 110, through post-processing, such as laser processing, photo-masking, etching, or any other similar and/or suitable post-processing. Hence, a detailed description of the islands 130 will be made after description of the deposition layer 120.

The deposition layer 120 is a thin-film layer formed by depositing a conductive member of a metallic material on or above the base 110. More specifically, the deposition layer 120 is formed by depositing a conductive member of a metallic material on the surface of the base 110. The deposition layer 120 is provided on the entire region of the base 110 or a region on which the texture of a metallic material is to be expressed and/or disposed. The deposition layer 120 is formed of at least one of aluminum (Al), titanium (Ti), Steel Use Stainless (SUS), nickel (Ni), gold, platinum or alloys thereof. The islands 130 are formed by post-processing the deposition layer 120, and, thus the material of the islands 130 are the same as the material of the deposition layer 120. However, in the present invention, the material of the deposition layer 120 or the material of the islands 130 are not limited to the above-described materials and may be any similar and/or suitable material that has conductivity and provides various metallic textures on the surface of the base 110.

The metallic conductive member is deposited on a face of the base 110. More specifically, the metallic conductive member is deposited on the surface of the base 110 by using at least one of Physical Vapor Deposition (PVD) or Chemical Vapor Deposition (CVD). For example, the deposition layer 120 may be formed on the surface of the base 110 by vaporizing a metallic material under vacuum through PVD, such as vacuum deposition, sputtering or ion plating. Gas of a metallic material may be provided to the surface of the base 110, and then the deposition layer 120 may be deposited on the surface of the base 110 using heat, plasma, or light.

In a cross section of the surface of the outer housing 100, a polymer layer 140 including a transparent polymeric material or semi-transparent polymeric material is provided between the base 110 and the islands 130. The polymer layer 140 is coated on a face of the base 110 to protect and planarize the surface of the base 110 prior to deposition of the deposition layer 120 thereon, thereby increasing a metal-depositing force. Thus, on the surface of the outer housing 100, a portion in which the base 110, the polymer layer 140, and the islands 130 are deposited sequentially in this order and a portion in which the base 110 and the polymer layer 140 are deposited are formed alternately. As will be described below, if the islands 130 are patterned on the surface of the base 110 and then a first layer 150 (see FIG. 5) and a second layer 160 (see FIG. 5) are further coated on the surface, then the outer housing 100, according to the present exemplary embodiment of the present invention, is completed.

The islands 130 are structures formed by post-processing the deposition layer 120, and are discontinuously formed to be spaced apart from each other on or above the base 110 and are formed to have 2D patterns. Hence, on the surface of the outer housing 100, the non-conductive material of the base 110 and the conductive material of the islands 130 are regularly or irregularly formed alternately. In other words, the surface of the base 110 and the islands 130 are positioned alternately. The islands 130 are formed by performing post-processing, such as laser processing, photo-masking, or etching, with respect to the deposition layer 120 deposited on the base 110. That is, by post-processing the deposition layer 120, the islands 130 are formed to have 2D patterns, are spaced apart from each other, and are patterned with a plurality of pieces 131. That is, one of the pieces 131 and its adjacent pieces 131 are spaced apart from each other to be positioned discontinuously and independently on the surface of the base 110.

Figure 3A:
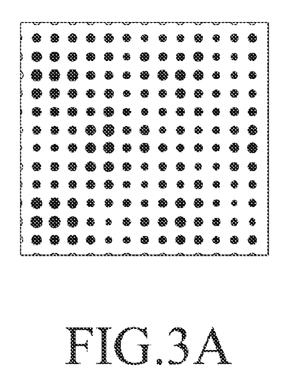
FIGS. 3A to 3C are diagrams illustrating various shapes of islands according to the exemplary embodiment illustrated in FIG. 2.
Figure 3B:
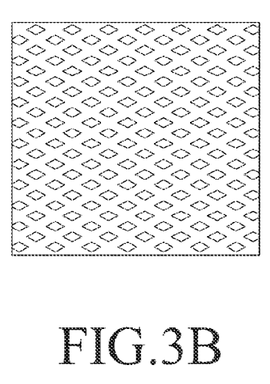
Figure 3C:
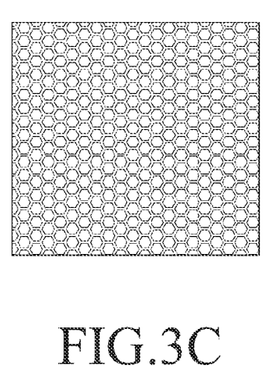
Figure 4:
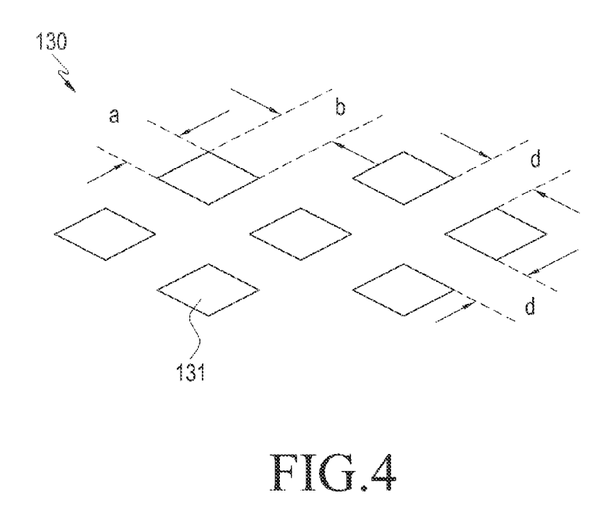
FIG. 4 is an enlarged diagram of one of the islands according to the exemplary embodiment illustrated in FIG. 3.

FIGS. 3A through 3C are diagrams illustrating various shapes of islands according to the exemplary embodiment illustrated in FIG. 2, and FIG. 4 is an enlarged diagram of one of the islands according to the exemplary embodiment illustrated in FIG. 3.

Referring to FIGS. 3A through 4, the islands 130 are respectively formed of the plurality of pieces 131 having a 2D pattern. For example, the pieces 131 may be formed to have a 2D pattern having dot figures formed repetitively or at random, as illustrated in FIG. 3A, may be formed to have a 2D pattern having diamond figures formed repetitively or at random, as illustrated in FIG. 3B, may be formed to have a 2D pattern having polygonal figures formed repetitively or at random, like in a beehive as illustrated in FIG. 3C, or may be formed to have any similar and/or suitable 2D pattern. In the present exemplary embodiment, the pieces 131 having the same-figure pattern are repetitively, that is, regularly formed. However, the present invention is not limited thereto. For example, the shapes of the islands 130 may vary as long as the pieces 131 are formed discontinuously to be positioned independently such that the non-conductive material is positioned between the conductive materials.

In particular, when the islands 130, each having a length a and a width b, as shown in FIG. 4, are positioned to be adjacent to an antenna module 200 (see FIG. 5), it is preferable that a size a×b of the piece 131 is small and a distance d between the piece 131 and its adjacent pieces 131 is large. However, the size of the pieces 131 is not limited to this example. The size of the pieces 131 may vary according to various conditions such as whether the pieces 131 are formed to be adjacent to the antenna module 200, the size of the outer housing 100, and the overall pattern of the islands 130.

As discussed before, the shape of the islands 130 may be a dot shape as illustrated in FIG. 3A, a diamond shape as illustrated in FIG. 3B, a beehive as illustrated in FIG. 3C, or any other similar and/or suitable shape. Herein, when the pieces 131 formed in the islands 130 have a diamond shape and are positioned to be adjacent to the antenna module 200, the size of the islands 130, more specifically, the size a×b of the piece 131, as given in millimeters (mm) may be at least one of 0.4 mm×0.4 mm, 0.3 mm×0.3 mm, and 0.2 mm×0.4 mm. The distance d between the adjacent pieces 131 may be 0.2 mm or more. However the present invention is not limited thereto, and the size a×b of the piece 131 formed in the islands 130 or the distance d between the pieces 131 may vary according to the shape of the islands 130 or the shape in which the pieces 131 are arranged. For example, the size a×b and the distance d may vary according to whether they are formed at random or repetitively. In the present exemplary embodiment of the present invention, the islands 130 have a diamond shape, however, the shape, form, composition, or structure of the islands 130 is not limited to this example. For example, the piece 131 of the islands 130 may have various shapes such as a dot shape, a triangular shape, a quadrilateral shape, or any other similar and/or suitable shape, and such shapes may be combined or the pieces 131 may be spaced apart from each other at random or repetitively, that is, irregularly or regularly.

As stated above, the islands 130 are formed by post-processing the deposition layer 120 with at least one of laser processing, photo-masking, etching, or any other suitable and/or similar post-processing method. For example, if the islands 130 are formed by processing the deposition layer 120 with laser processing, the pieces 131 in the diamond shape are etched by applying laser to the base 110 on which the deposition layer 120 is provided, such that the pieces 131 are spaced apart from each other to be positioned independently.

Figure 5:
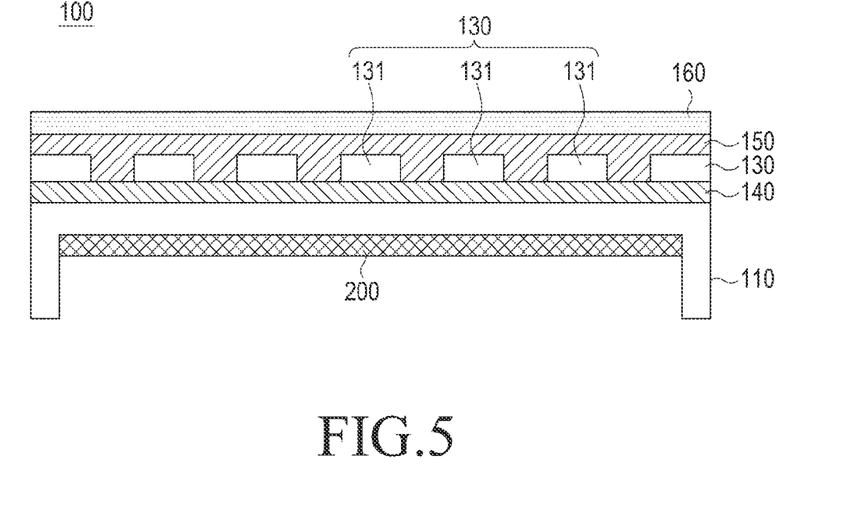
FIG. 5 is a cross-sectional view illustrating a structure of an outer housing according to the exemplary embodiment illustrated in FIG. 2.

FIG. 5 is a cross-sectional view illustrating a structure of an outer housing according to the exemplary embodiment illustrated in FIG. 2.

Referring to FIG. 5, the deposition layer 120 deposited on the surface of the base 110 is post-processed into the islands 130, and then the first layer 150 of a transparent or semi-transparent material is formed on the top face of the outer housing 100 to express or provide various colors. The second layer 160 of a transparent material is formed on the top face of the first layer 150 to protect the surface and express or provide gloss. Hence, the surface of the outer housing 100 has a metallic texture and various colors through a metallic material, and the exterior of the outer housing 100 is made to look glossy or, in other words, luxurious. Moreover, according to the patterns of the islands 130, various designs are provided. As mentioned previously, the pieces 131 of a metallic material are separated from each other such that, outwardly, the islands 130 of a conductive material are independently positioned with a non-conductive material therebetween. Thus, when the outer housing 100 is provided on the electronic device 10 on which the antenna module 200 is mounted, the islands 130 of a conductive metallic material do not affect radiation performance of the antenna module 200.

Figure 6:
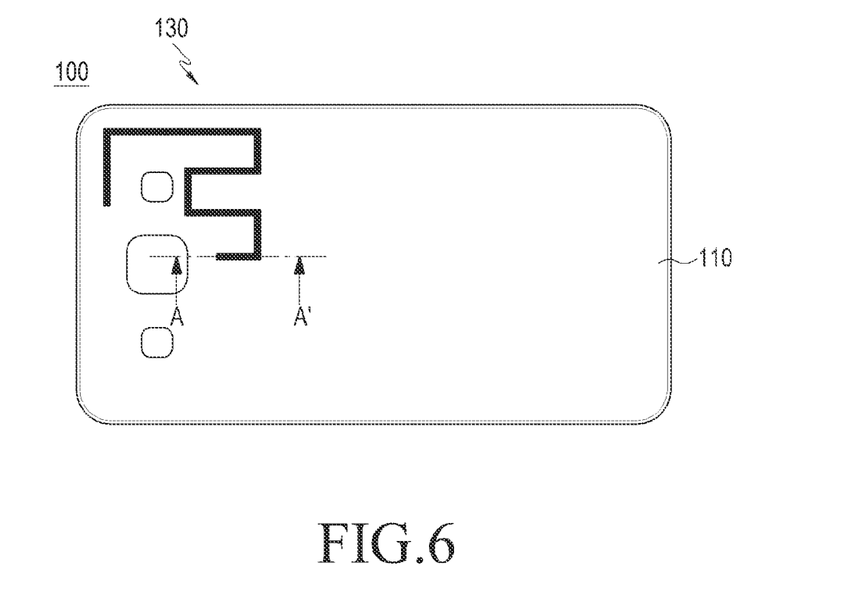
FIG. 6 is a diagram illustrating a state in which islands formed in an outer housing are provided as antennas in the outer housing according to the exemplary embodiment illustrated in FIG. 2.

FIG. 6 is a diagram illustrating a state in which islands formed in an outer housing are provided as an antenna in the outer housing according to the exemplary embodiment illustrated in FIG. 2.

Referring to FIG. 6, when the outer housing 100 is provided in a device such as the electronic device 10, the islands 130 may be formed as an antenna pattern. That is, the islands 130 formed as the antenna pattern are connected with an internal circuit component 170 (see FIG. 7) of the electronic device 10, thus operating as an antenna in the electronic device 10. More specifically, the outer housing 100 is assumed to be provided in the battery cover of the electronic device 10. The deposition layer 120 deposited on an inner side or an outer side of the base 110, which may be injection-molded in the shape of the battery cover, is formed to be an antenna with the islands 130 having a predetermined length. In order to form the islands 130 which operate as an antenna pattern, the deposition layer 120 is formed by the LDS method. In order to use the LDS method, the base 110 may be injection-molded with resin, such as LDS resin, which allows the LDS method, or, alternatively, the LDS resin is coated onto the position of the base 110 in which the islands 130 are disposed. If the islands 130 having an antenna pattern are formed on the inner side of the battery cover, then, when the battery cover covers the electronic device 10, the islands 130 are electrically connected with the internal circuit component 170 provided inside the electronic device 10, and thus, the islands 130 function as an antenna. Therefore, the electronic device 10 in which the antenna is formed integrally with the outer housing 100, more specifically, the battery cover, may be implemented.

Figure 7:
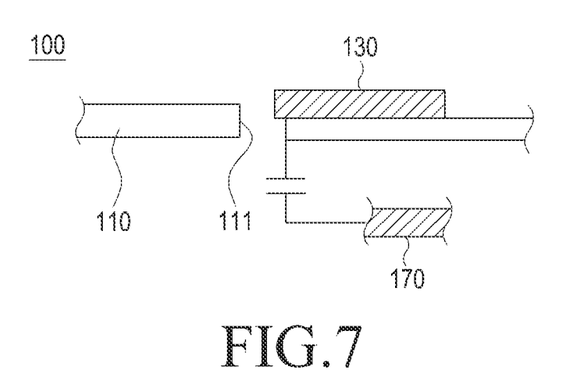
FIG. 7 is a diagram illustrating a state in which islands formed on a face of an outer housing are connected with an internal circuit board as antennas according to the exemplary embodiment illustrated in FIG. 6.

FIG. 7 is a diagram illustrating a state in which islands formed on a face of an outer housing are connected with an internal circuit board as an antenna according to the exemplary embodiment illustrated in FIG. 6.

Referring to FIG. 7, the islands 130 having the antenna pattern are formed on the base 110 corresponding to the outer side of the battery cover. A hole 111 is formed such that when the battery cover covers the electronic device 10, the islands 130 disposed on the outer side of the battery cover may be electrically connected with the internal circuit component 170 provided inside the electronic device 10. The hole 111 is formed to penetrate the inner side and the outer side of the base 110, such that an end of the hole 111 is electrically connected with the islands 130 and another end of the hole 111 is electrically connected with the internal circuit component 170.

When the islands 130 are formed on the outer side of the outer housing 100, they may have various shapes, such as character forms, letters, manufacturers' logos, or any other similar and/or suitable shape. Thus, the islands 130 may form an image in terms of design as well as a pattern on the outer side of the outer housing 100. For example, the islands 130 may be formed to have a logo of 'SAMSUNG' when the deposition layer 120 is processed, and in this way, various images may be formed in terms of design. When the logo is positioned on the antenna module 200 of the electronic device 10, a plurality of the pieces 131 are separated and spaced apart from each other to be positioned independently, thus suppressing an influence upon radiation performance of the antenna module 200. In addition, if the logo, image or design expressed by the islands 130 is connected to form one pattern and the islands 170 are electrically connected with the internal circuit component 170 through the hole 111, the logo, image or design may operate as an antenna integrally formed with the outer housing 100.

Figure 8A:
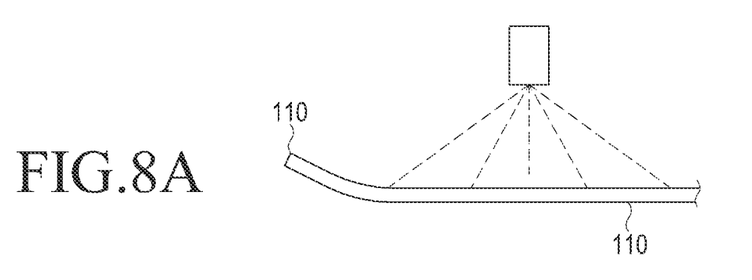
FIGS. 8A to 8C are diagrams illustrating a process of manufacturing islands on a face of an outer housing according to the exemplary embodiment illustrated in FIG. 6.
Figure 8B:
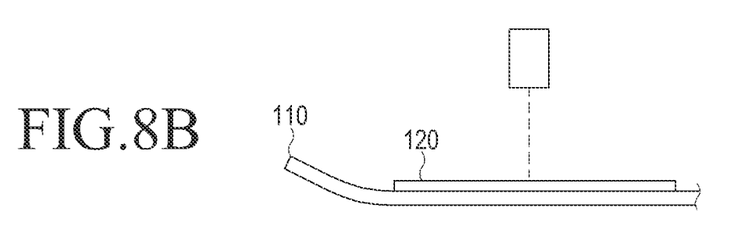
Figure 8C:
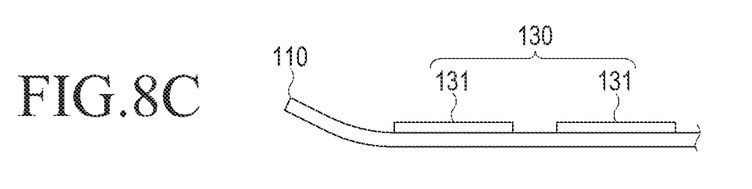

FIGS. 8A through 8C are diagrams schematically illustrating a process of manufacturing islands on a face of an outer housing according to the exemplary embodiment illustrated in FIG. 6.

Referring to FIGS. 8A through 8C, the deposition layer 120 is processed by LDS to form the islands 130 having the shape of an antenna. As described above, when the deposition layer 120 is patterned into the shape of an antenna through LDS, the base 110 may be injection-molded using resin which allows LDS, wherein the resin may be a material such as PC+ABS or any suitable material which allows LDS and which is coated on the surface of the base 110 in which the antenna is to be formed, thereby forming the deposition layer 120 on the surface of the base 110.

Figure 9:
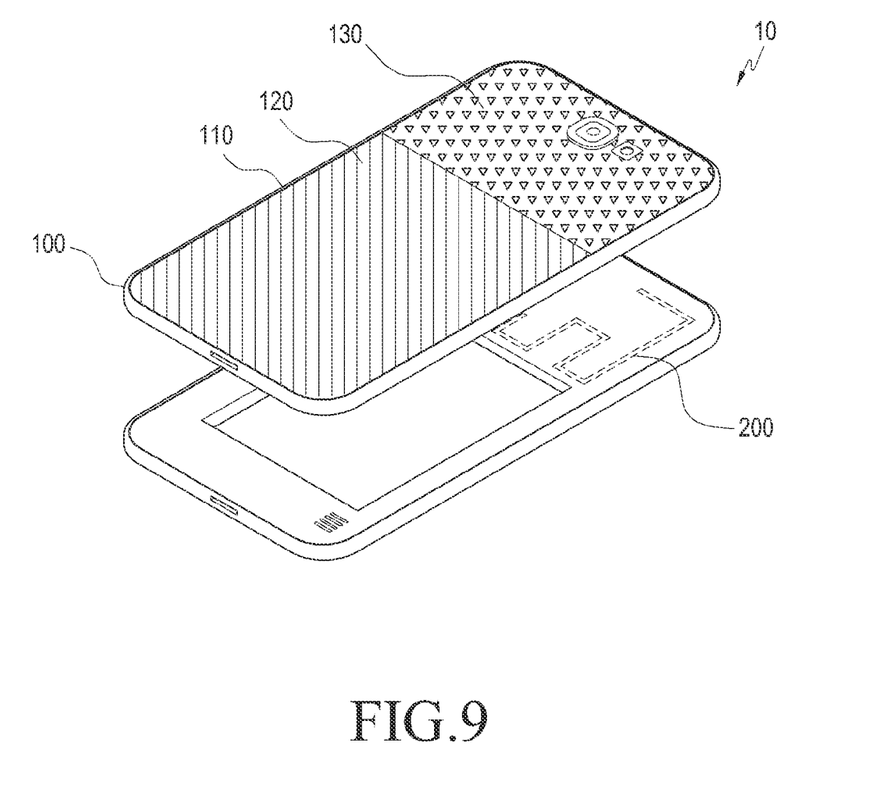
FIG. 9 is a diagram illustrating a state in which an outer housing is provided on an electronic device according to the exemplary embodiment illustrated in FIG. 4.

FIG. 9 is a diagram illustrating a state in which an outer housing is provided on the electronic device according to the exemplary embodiment illustrated in FIG. 4.

Referring to FIG. 9, when the outer housing 100, which may be included in the battery cover, is in a position adjacent to the antenna module 200 of the electronic device 10, then the islands 130 are disposed so as to not to affect radiation performance, and in the other portions of the battery cover which are not adjacent to the antenna module 200, the deposition layer 120 may be provided. More specifically, after the deposition layer 120 is deposited on the entire region of the base 110, the deposition layer 120 deposited in the area corresponding to the antenna module 200, i.e., an area that is substantially directly above or facing the antenna module 200, is post-processed by laser processing or the like, such that the independently spaced islands 130 are formed.

In the electronic device 10 according to the present exemplary embodiment, the antenna module 200 is mounted on the top face of a battery mounting portion. Thus, on a portion of the outer housing 100, or in other words, on a portion of a surface of the battery cover, covering the antenna module 200, a top portion of the outer side of the battery cover disposed at a position corresponding to the antenna module 200 is patterned into the islands 130 and an entire surface of the other portion of the battery cover, a remaining portion of the outer housing 100 not having the islands 130, is formed by the deposition layer 120. In this way, the battery cover which does not affect radiation performance of the antenna module 200 while having a metallic texture may be provided.

As mentioned above, in the position of the antenna module 200 in the electronic device 10, the islands 130 are formed so as to not affect radiation performance of the antenna, and the deposition layer 120 may be positioned in a portion of the outer housing 100 corresponding to where the antenna module 200 is not formed. In the present exemplary embodiment, the antenna module 200 is positioned on the top portion of the electronic device 10, such that the top portion of the outer side of the outer housing 100 forms the islands 130 under which the metallic deposition layer 120 is formed. In the present exemplary embodiment, the islands 130 are formed on a partial face of the outer housing 100. However, the present invention is not limited thereto, and the islands 130 may also be formed on the entire face of the outer housing 100 or any portion of the outer housing 100 that corresponds to the antenna module 200. That is, the separation position, rate, and shape of the islands 130 may vary according to the position of the antenna module 200 or the design of the electronic device 10.

Figure 10:
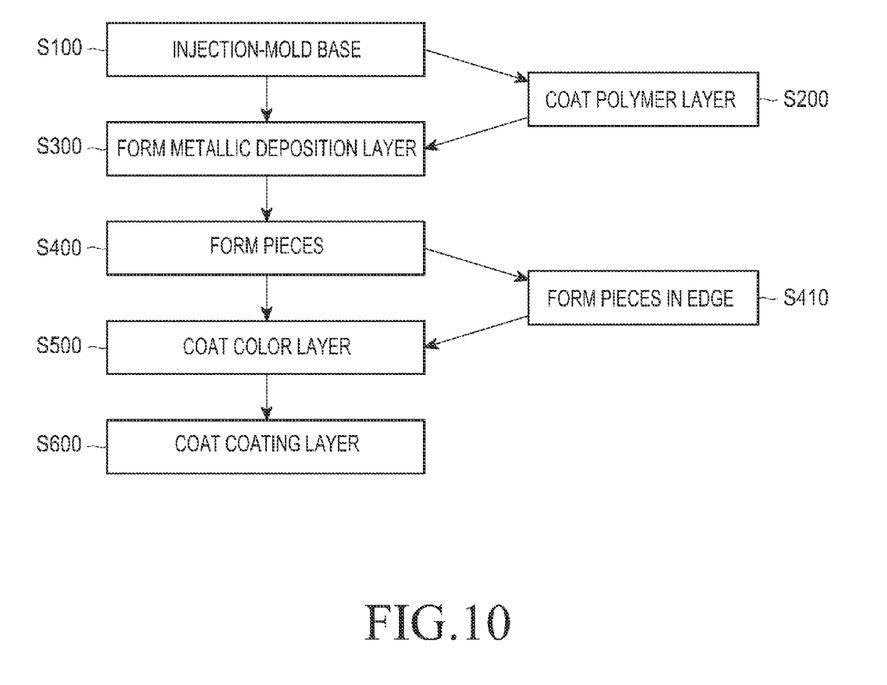
FIG. 10 is a flowchart illustrating a method for manufacturing an outer housing according to the exemplary embodiment illustrated in FIG. 4.

FIG. 10 is a flowchart illustrating a method for manufacturing outer housing according to the exemplary embodiment illustrated in FIG. 4.

Referring to FIG. 10, the outer housing 100 injection-molds the base 110 by using the aforementioned plastic material in step S100. After injection-molding of the base 110 in step S100, the polymer layer 140 is coated to supplement a defect on the surface of the base 110 and facilitate attachment of a metallic material on the surface of the base 110 in step S200. The base 110 on which the polymer layer 140 is coated is disposed in a deposition chamber in order to deposit a metallic conductive material, such as aluminum (Al), titanium (Ti), steel, such as Steel Use Stainless (SUS), chrome (Cr), gold (Au), platinum (Pt), or any other similar and/or suitable metallic conductive material, onto the surface of the base 110 by using PVD or CVD, such as sputtering, thus forming the deposition layer 120 in step S300.

Then, in step S400, the deposition layer 120 formed on the surface of the base 110 is etched by post-processing, such as laser processing, photo-masking or etching, thereby forming the islands 130 having the 2D pattern, which include the pieces 131, and which are spaced apart from each other to be formed discontinuously. As mentioned above, the islands 130 include the pieces 131 which have 2D patterns formed repetitively or at random, that is, regularly or irregularly, in which conductive materials are discontinuously separated by a non-conductive material. That is, the respective pieces 131 are spaced apart from each other to be positioned independently, such that they are not electrically connected with each other. Hence, even if metallic materials are disposed at a position corresponding to the antenna module 200 provided inside the electronic device 10, the radiation performance of the antenna module 200 is not affected. The islands 130 may be formed in patterns of various figures as stated previously. The pieces 131 of the islands 130 may be regularly or irregularly arranged. Remaining steps S410, S500, and S600 will be described below with reference to FIG. 11.

Figure 11:
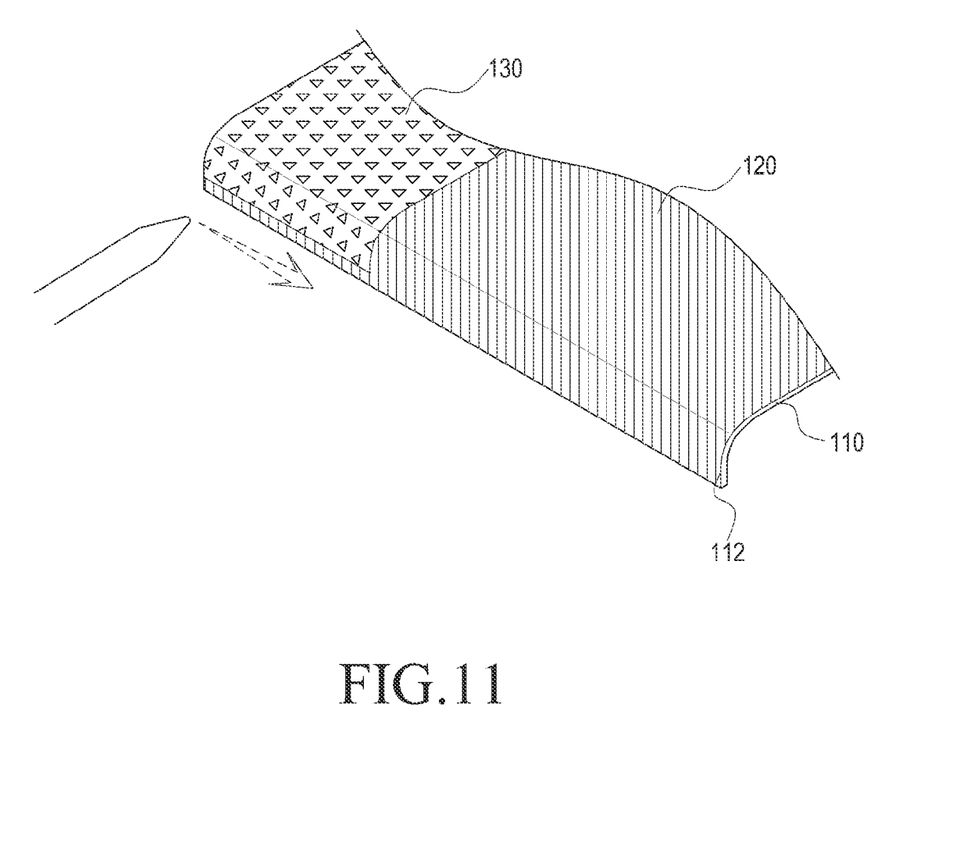
FIG. 11 is a diagram illustrating a state in which a portion of a curved outer housing is post-processed with islands according to an exemplary embodiment of the present invention.

FIG. 11 is a diagram illustrating a state in which a portion of a curved outer housing is post-processed to islands according to an exemplary embodiment of the present invention.

Referring to FIGS. 10 and 11, for the outer housing 100, which includes the battery cover, an edge 112 of the battery cover forms a predetermined curved surface for the purpose of design or the like. However, the present invention is not limited thereto, and the edge 112 may be curved, flat, or have any similar and/or suitable shape. A portion of the edge 112 may be maintained to extend in to an area having the islands 130 and the islands 130 may not be formed in the portion of the edge 112 extending into the area having the islands 130 in post-processing. In particular, if a portion of the battery cover in which the islands 130 are formed is adjacent to the antenna module 200, the radiation performance of the antenna module 200 may be affected by the portion in which the islands 130 are not formed. Hence, the deposition layer 120 around the edge 112 is post-processed once more such that it may be discontinuous like the islands 130. In this way, the islands 130 may be formed also in the edge 112 in step S410.

On the top face of the base 110 in which the islands 130 are formed, the first layer 150 of a transparent or semi-transparent material, which provides a particular color of the outer housing 100, is coated in step S500. The second layer 160 including a transparent material is coated on the top face of the first layer 150 to protect the surface and express gloss in step S600. Thus, even if the metallic materials are deposited on the base 110, the outer housing 100 of the electronic device 10 may be provided such that the outer housing 100 does not affect radiation performance of the antenna module 200, has a luxurious exterior by expressing a metallic texture through a metallic material, and implements various designs.

As is apparent from the foregoing description, a metallic texture may be expressed or provided in an outer housing of an electronic device by providing a high-luminance conductive metallic material on the surface of the outer housing, thereby improving the elegance of the outer housing, and furthering the elegance of the overall exterior of the electronic device on which the outer housing is mounted. Moreover, even if the metallic materials are provided on the surface of the outer housing, they are separated and positioned independently, such they do not affect radiation performance of the antenna module provided inside the electronic device.

Furthermore, the islands are patterned in the shape of an antenna and are connected with the internal circuit component, such that the islands may operate as the antenna, and by providing the outer housing in which the antenna is provided integrally, radiation performance of the antenna module provided inside the electronic device may be improved. In addition, various designs or logos may be provided through the islands of the metallic materials provided on the outer side of the outer housing, thereby forming the design on the outer housing. A logo or a character having a predetermined length may also be electrically connected to the internal circuit component to form an antenna, thereby providing the antenna function and variety in terms of design.

While the present invention has been shown and described with reference to certain exemplary embodiments thereof, it will be understood by those skilled in the art that various changes in form and details may be made therein without departing from the spirit and scope of the as defined by the appended claims and their equivalents.

What is claimed is:

1. An electronic device comprising:
 an outer housing including a portion comprising:
  a base comprising a non-conductive material;
  a plurality of islands formed on or above the base; and
  a coating layer between the base and the plurality of islands,
 wherein the plurality of islands comprise a metallic material,
 wherein the coating layer comprises a material different from the non-conductive material of the base and the metallic material of the plurality of islands,
 wherein the plurality of islands are spaced apart from each other, and
 wherein the plurality of islands form a two-dimensional (2D) pattern.

2. The electronic device of claim 1, wherein the portion of the outer housing comprises a battery cover.

3. The electronic device of claim 2, wherein the plurality of islands are provided on an entire face or a partial face of the battery cover.

4. The electronic device of claim 3, wherein the partial face is adjacent to an antenna module when the plurality of islands are provided on the partial face of the battery cover.

5. The electronic device of claim 1, wherein the coating layer comprises a transparent polymeric material or semi-transparent polymeric material between the base and the plurality of islands.

6. The electronic device of claim 1, wherein the portion of the outer housing further comprises a first layer which is formed on surfaces of the plurality of islands and on a surface of the base exposed between the plurality of islands, and
 wherein the first layer comprises a transparent or semi-transparent material.

7. The electronic device of claim 1, wherein the portion of the outer housing further comprises a second layer formed on the first layer, and
wherein the second layer comprises a transparent material.

8. The electronic device of claim 1, wherein the 2D pattern is a repetitive pattern.

9. The electronic device of claim 1, wherein the 2D pattern is a random pattern.

10. The electronic device of claim 1, wherein the plurality of islands have diamond patterns.

11. The electronic device of claim 1,
wherein the plurality of islands have a size, in millimeters (mm) of at least one of 0.4 mm×0.4 mm, 0.3 mm×0.3 mm, and 0.2 mm×0.4 mm, and
wherein the plurality of islands have a distance of at least 0.2 mm between adjacent ones of the plurality of islands.

12. The electronic device of claim 1, wherein the plurality of islands are formed of at least one of aluminum (Al), titanium (Ti), Steel Use Stainless (SUS), nickel (Ni), gold (Au), platinum (Pt), and alloys including at least one of Al, Ti, SUS, Ni, Au, and Pt.

13. The electronic device of claim 1, wherein the outer housing is at least one of a front case, a rear case, and a battery cover of the electronic device.

14. The electronic device of claim 1, wherein the plurality of islands are formed to have a shape of an antenna pattern, and
wherein the plurality of islands are connected with an internal circuit component of the electronic device to operate as an antenna.

15. The electronic device of claim 14,
wherein the antenna is provided on an outer side of the base, and
wherein the antenna is electrically connected with the internal circuit component through a hole formed in the base.

16. The electronic device of claim 14,
wherein the antenna is provided on an inner side of the base, and
wherein the antenna is electrically connected with the internal circuit component.

17. The electronic device of claim 14, wherein the base is injection-molded with resin for Laser Direct Structuring (LDS) or the resin for LDS is coated on a portion of the outer housing comprising the plurality of islands of the base.

18. The electronic device of claim 1, wherein the plurality of islands are provided on an entire face of the outer housing or a partial face of the outer housing.

19. The electronic device of claim 18, wherein the partial face is adjacent to an antenna module when the plurality of islands are provided on the partial face of the outer housing.

20. An outer housing of an electronic device, the outer housing comprising:
a base formed of a non-conductive material;
islands formed of a conductive material deposited on the base; and
a coating layer formed of a material different from the non-conductive material of the base and the conductive material of the islands,
wherein the islands are formed discontinuously on the base such that the conductive material and the non-conductive material are positioned alternately, and
wherein the coating layer is formed between the base and the islands.

21. An outer housing of an electronic device, the outer housing comprising:
a surface comprising a non-conductive material and a conductive material forming regular or irregular patterns,
wherein the non-conductive material and the conductive material are both formed discontinuously, and
wherein a layer of material different from the non-conductive material and the conductive material is formed on the surface of the outer housing between the non-conductive material and the conductive material.

22. An electronic device comprising:
a base formed of a non-conductive material in a shape of at least one of a front case, a rear case, and a base cover, the base being injection-molded;
islands comprising pieces formed by depositing a conductive metallic material on a surface of the base and by performing etching or laser processing, the pieces being spaced apart from each other so as to not physically contact each other; and
a coating layer formed between the base and the islands, wherein the coating layer comprises a material different from the non-conductive material of the base and the conductive metallic material of the islands.

23. A method for manufacturing an outer housing of an electronic device, the method comprising:
injection-molding a base;
depositing a coating layer on the base; and
forming a plurality of islands on or above the coating layer deposited on the base,
wherein the plurality of islands comprise a metallic material,
wherein the coating layer comprises a material different from the base and the islands, and
wherein the plurality of islands are spaced apart from each other to form a two-dimensional (2D) pattern.

24. The method of claim 23, wherein the forming of the plurality of islands comprises:
forming a deposition layer by depositing a metallic material on or above the base; and
performing post-processing on the deposition layer such that the plurality of islands are spaced apart from each other and form the 2D pattern.

25. The method of claim 24, wherein the forming of the plurality of islands further comprises performing post-processing on an edge of the outer housing once more if the edge is curved in order to form the plurality of islands on the edge.

26. The method of claim 23, further comprising forming a layer comprising a transparent polymeric material or semi-transparent polymeric material after the injection-molding of the base.

27. The method of claim 23, further comprising, after the forming of the plurality of islands, forming a first layer of a transparent or semi-transparent material on surfaces of the base and a surface of the base exposed between the plurality of islands.

28. The method of claim 27, further comprising, after the forming of the first layer, forming a second layer comprising a transparent material on the first layer.

* * * * *